UNITED STATES PATENT OFFICE.

ALOÏS VIQUERAT, OF LAUSANNE, SWITZERLAND; WIDOW AND HEIRS OF SAID ALOÏS VIQUERAT, DECEASED, ASSIGNORS TO SOCIÉTÉ GÉNÉRALE POUR L'EXPLOITATION DE LA CATALYSINE ET AUTRES PRODUITS PHARMACEUTIQUES.

MEDICINAL COMPOSITION.

1,081,069.     Specification of Letters Patent.     Patented Dec. 9, 1913.

No Drawing.     Application filed December 11, 1911. Serial No. 665,142.

*To all whom it may concern:*

Be it known that I, ALOÏS VIQUERAT, doctor of medicine, a citizen of Switzerland, residing at Lausanne, Canton of Vaud, in the Confederation of Switzerland, have invented certain new and useful Improvements in Medicinal Compositions, of which the following is a specification.

The present invention relates to a composition which is intended to be used internally and which confers to the organisms immunity against the following microbial infectious illnesses: diphtheria, pneumonia, typhus, scarlet fever, influenza, septic infections, cerebral-spinal meningitis, syphilis, pest, cholera and tuberculosis; it is also effective in another kind of disease, viz. goiter.

This remedial composition or substance does not contain any substances strange to the organism. Therefore the innocuity of the remedy is perfect. The principal of these substances is creatinin; creatinin used alone in the quantity of from 0.05 gram to 0.10 gram is a sure remedy against diphtheria. For all other diseases already mentioned: pneumonia, typhus, scarlet fever, influenza, septic infections, cerebral-spinal meningitis, syphilis, pest, cholera, tuberculosis and goiter, it is preferable to mix with the creatinin two other substances, allantoin and guanidin. The creatinin is the controlling agent but the two others mentioned impart to the creatinin more efficacy.

This remedial composition is intended to be taken internally in the form of syrup, pastils, pills or the like. It may for example advantageously be of the following composition: 0.20 part by weight of chemically prepared creatinin, 0.01 part by weight of guanidin, 0.10 part by weight of allantoin, 100.00 part by weight of water. This solution is mixed with a small quantity of an excipient substance such as for instance acid pulp of tamarind or a few drops of lemon juice or an organic acid, for example, malic or tartaric or citric or succinic acid and the like. Sugar may also be added. The acids are employed for acidulating the paste of the pastils or other forms of the remedy in order to prevent the creatinin from being converted into creatin which has no efficacy at all.

It is to be understood that I do not confine myself to the above mentioned proportions, although those given I have found from practice to give the best results.

I claim as my invention:

1. A medicinal composition for internal use containing chemically prepared creatinin, guanidin and allantoin.

2. A medicinal composition for internal use comprising the following ingredients: 0.20 part by weight of creatinin, 0.01 part by weight of guanidin, 0.10 part by weight of allantoin, 100.00 parts by weight of water, with which is mixed an excipient substance.

In testimony whereof I have affixed my signature in presence of two witnesses.

ALOÏS VIQUERAT.

Witnesses:
   ROD. DE WURSTEMBERGER,
   G. IMER.